United States Patent [19]

Kobayashi et al.

[11] 4,315,297

[45] Feb. 9, 1982

[54] HAMMER DRIVE SAFETY DEVICE FOR PRINTER

[76] Inventors: Tsuneki Kobayashi; Hiroshige Nakano, both c/o Hitachi Koki Company Limited, No. 1060, Tadeda, Katsuta-shi, Ibaraki, Japan

[21] Appl. No.: 56,736

[22] Filed: Jul. 11, 1979

Related U.S. Application Data

[63] Continuation-in-part of Ser. No. 862,815, Dec. 21, 1977, abandoned.

[30] Foreign Application Priority Data

Dec. 23, 1976 [JP]  Japan .................................. 51-157028

[51] Int. Cl.³ .............................................. H02H 3/24
[52] U.S. Cl. ..................................... 361/191; 361/86; 361/98; 361/93; 101/93.29
[58] Field of Search ..................... 361/93, 94, 98, 191, 361/86; 101/93.29; 400/54

[56] References Cited

U.S. PATENT DOCUMENTS

| | | | |
|---|---|---|---|
| 3,243,665 | 3/1966 | Fayer et al. | 361/191 |
| 3,589,282 | 6/1971 | King | 361/191 |
| 3,748,537 | 7/1973 | Vigini | 361/86 |
| 3,998,152 | 12/1976 | Hupp | 361/98 |
| 4,019,100 | 4/1977 | Barrus | 101/93.29 |

FOREIGN PATENT DOCUMENTS 2517766  1/1976  Fed. Rep. of Germany ........ 400/54

*Primary Examiner*—J. D. Miller
*Assistant Examiner*—L. C. Schroeder
*Attorney, Agent, or Firm*—Fulwider, Patton, Rieber, Lee & Utecht

[57] ABSTRACT

A hammer drive safety device for a line printer having a plurality of solenoid-driven hammers is disclosed, which includes a time limiting circuit for producing an output when a character print command signal is not produced for more than a predetermined duration, the plurality of detectors for detecting currents flowing through the respective solenoids, and a switch responsive to the output of the time limiting circuit and the outputs of the detector for disconnecting the solenoids from the power source.

7 Claims, 2 Drawing Figures

HAMMER DRIVE SAFETY DEVICE FOR PRINTER

This application is a continuation in part of U.S. Ser. No. 862,815, filed Dec. 21, 1977 and now abandoned.

BACKGROUND OF THE INVENTION

The present invention generally relates to a safety device for a line printer, and more particularly to a hammer drive safety device suitable for use in the printer.

It is apparent to those skilled in the art that hammer driving solenoids tend to be damaged or destroyed by burning out if a current flows through any of solenoid continuously over a predetermined period of time.

In order to prevent such an accident, there has been proposed a provision of fuses connected in series with the respective solenoids so that they cut out the solenoids from a power source in the event of such an abnormal operation thereof. However, the provision of fuses requires a large space and time consuming works resulting in an extremely high cost.

SUMMARY OF THE INVENTION

It is, accordingly, an object of the present invention to provide a novel type hammer drive safety device capable of positively preventing such an accident or trouble with an inexpensive and compact circuit construction.

The object of the invention is attained by a hammer drive safety device comprising a time limiting circuit for producing an output when a character print command signal is not produced for more than a predetermined duration. The plurality of detectors for detecting currents flowing through the respective solenoids, and a switch device responsive to the output of the time limiting circuit and the outputs of the detectors for disconnecting the solenoids from a power source when the former is continuously supplied with the current over the predetermined period of time.

DETAILED DESCRIPTION OF THE EMBODIMENTS

Figure 1:
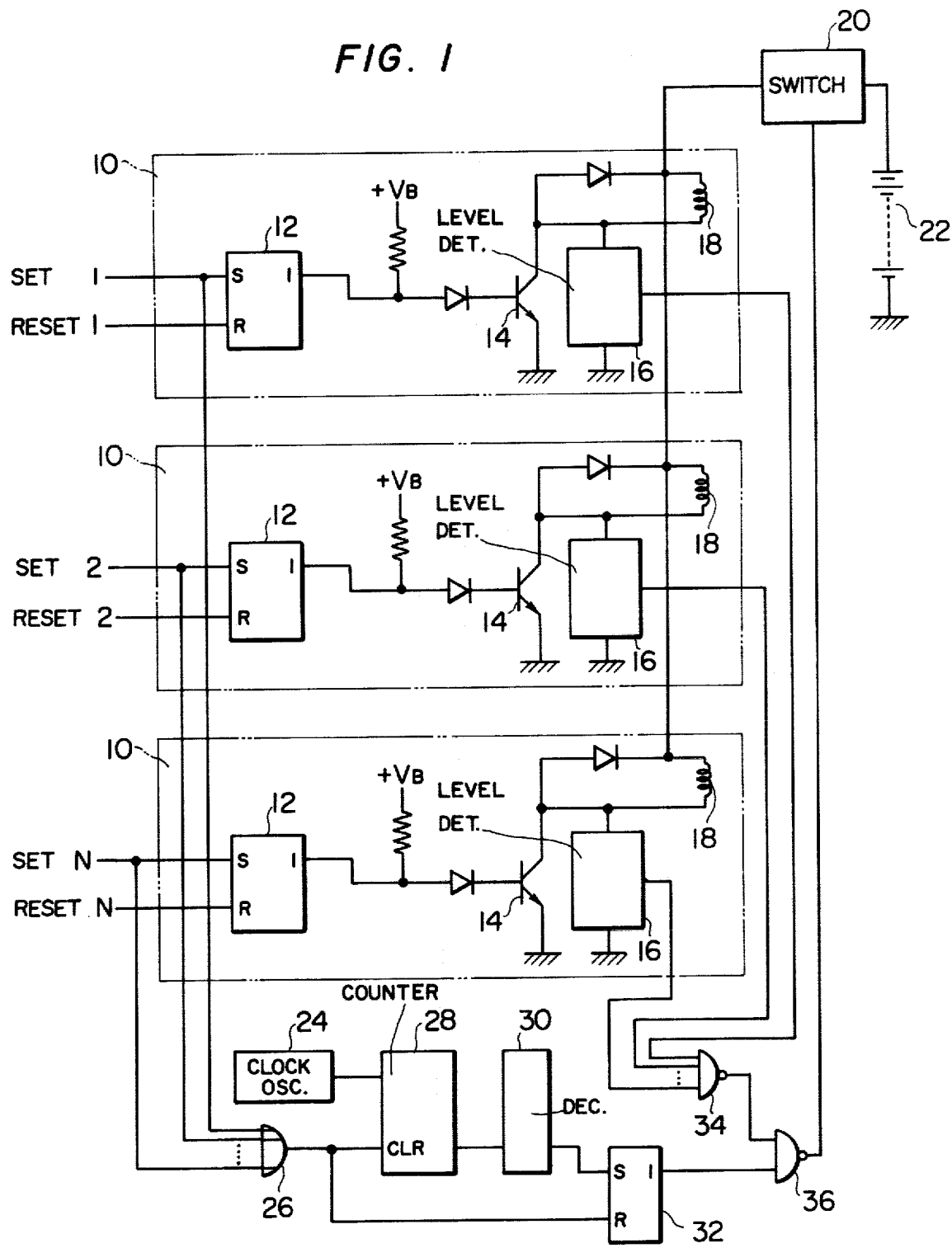
FIG. 1 is a schematic circuit diagram, partially shown in a block form, of a hammer drive safety device according to one embodiment of the invention.

FIG. 1 shows a circuit diagram of an embodiment of the present invention, in which each of a plurality (N) of drive circuits 10 comprises a flip-flop 12 having a set input S adapted to receive a set signal produced when a printing data code and a character data code coming into a printing position are coincident, a transistor 14 which is rendered conductive when the flip-flop 12 is set, a level detector 16 for detecting on and off of the transistor 14 and a solenoid 18 having one end connected to a collector of the transistor 14 and the other end connected to a d.c. power source 22 through a switch device 20 for driving a corresponding printing hammer (not shown). The level detector 16 may be constituted with a pair of series connected resistors.

The flip-flop 12 has a reset input R which receives a reset signal produced at a predetermined time $t_{HD}$ after the occurrence of the set signal to reset the flip-flop 12. That is, the transistor 14 is rendered conductive for the time $t_{HD}$ to energize the solenoid 18 for the same duration. Since a circuit for providing the set and reset signals is clear for those skilled in the art it is not shown in FIG. 1.

The level detector 16 produces a logical value 0 at an output thereof when the transistor 14 conducts.

The embodiment in FIG. 1 further comprises a clock oscillator 24 which produces clock pulses with a periodic interval $t_p$. The clock pulses are supplied to a count input of a counter 28.

The counter 28 is cleared by an output of an OR gate 26 which functions to logically sum the set signals applied to the set inputs S of the flip-flops 12 of the drive circuits 10.

When the counter 28 counts a predetermined number of clock pulses corresponding to an integer K which satisfies $K > t_{HD}/t_p$, a decoder 30 produces an output to be applied to a set input of a flip-flop 32.

The flip-flop 32 has a reset input R to which an output of an OR gate 26 is applied.

The oscillator 24, the counter 28, the decoder 30 and the flip-flop 32 constitute a time limiting circuit of the present invention.

A NAND gate 34 has the plurality of inputs connected to the outputs of the level detectors 16, respectively. An output of the NAND gate 34 is connected to one input of a NAND gate 36 the other input of which is connected to an output of the flip-flop 32.

Figure 2:
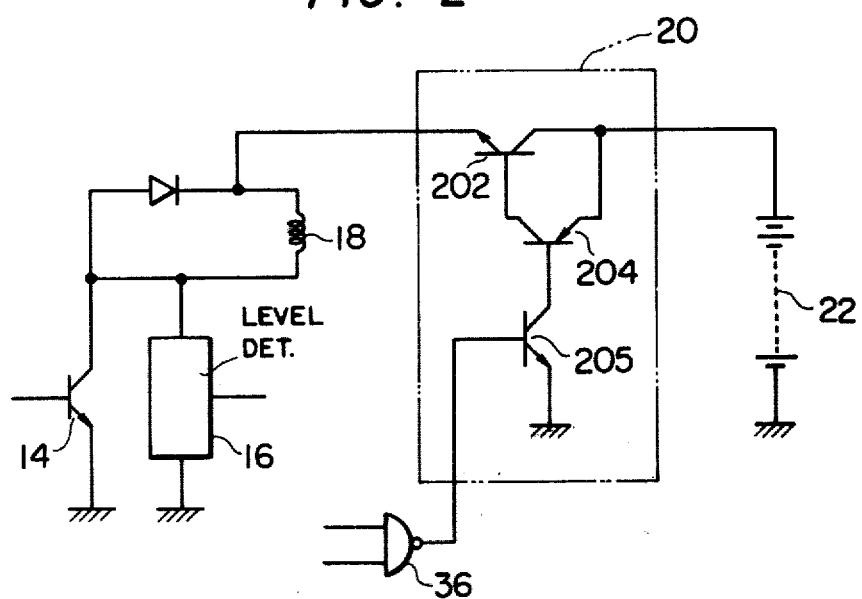
FIG. 2 is a circuit diagram of a switch device for use in the safety device in FIG. 1.

FIG. 2 is an example of a circuit diagram of the switch device 20 where the relation of the switch device 20 to the drive circuits 10 is shown. The switch device 20 comprises an NPN transistor 202 having an emitter connected to the other end of each solenoid 18, a collector connected to the power source 22 and a base connected to a collector of a PNP transistor 204. The transistor 204 has an emitter connected to the collector of the transistor 202 and a base connected to a collector of an NPN transistor 205 whose emitter is grounded and whose base is connected to the ouput of the NAND gate 36.

The switch device 20 may be constituted differently from that in FIG. 2. For example, it is possible to constitute it with an electromagnetic relay or thyristor etc.

In operation, when a print command signal is suitably produced in the printer to supply the set signal to one of the flip-flops 12 of the drive circuits 10 and thus the flip-flop 12 is set, the transistor 14 of the drive circuit 10 become conductive and therefore the solenoid 18 associated therewith is supplied with a d.c. current from the d.c. power source 22 to thereby drive the printing hammer associated therewith. At the same time the counter 28 is cleared by the output of the OR gate 26.

At the predetermined time $t_{HD}$ after the setting of the flip-flop 12, the reset signal is supplied to reset input R of the flip-flop 12 to reset the latter, so that the transistor 14 becomes non-conductive and the energization of the solenoid 18 is terminated if the drive circuit 10 operates properly.

The energization of the solenoids 18 is terminated upon receipt of the reset signal supplied to the reset inputs of the flip-flops 12 so that the transistor 14 becomes non-conductive after the time interval $t_{HD}$.

However, when the transistors 14 cannot become nonconductive for some reasons such as damages of the transistors 14 themselves, absence of the reset signal due to malfunction of the set-reset signal generator of the printer, malfunctions of the flip-flops 12 or malfunction of the base circuits of the transistors 14, there is a strong probability of burning of the solenoids 18 as mentioned previously.

This problem can be resolved by the level detector 16 provided in each of the drive circuit 10 and the time limiting circuit.

Each of the level detectors 16 provides an output corresponding to logical value 0 when a current flows in the associated solenoid 18. Therefore, if at least one of the solenoids 18 carries a current, logical value 1 signal is provided at the output of the NAND gate 34 connected to one input of the NAND gate 36.

Upon the set signal being applied to the set input of the flip-flop 12, the counter 28 is cleared and the clock pulses from the oscillator 24 are recounted therein and, when it counts the predetermined number of the clock pulses corresponding to the integer K, it provides an output which is applied to the decoder 30. In response to the output of the counter 28, the decoder 30 provides an output which is applied to the set input of the flip-flop 32.

The flip-flop 32 is reset by the set signal supplied to the flip-flop 12. Therefore, if, for some reasons the reset signal is not supplied to the flip-flop 12 after the predetermined time $t_{HD}$ from the occurrence of the set signal for the flip-flop 12 the flip-flop 32 remains in the set condition providing a logical value 1 output to the NAND gate 36. In this case if at least one of the solenoids 18 carries a current, the NAND gate 36 provides a logical value 0 output.

When the signal of logical value 0 appears at the output of the NAND gate 36, both the transistors 205 and 206 are rendered OFF and the transistor 202 is in turn rendered OFF, whereas when the signal of logical value 1 appears at the output of the NAND gate 36, both the transistors 205 and 206 are rendered ON and the transistor 202 is in turn rendered ON.

According to the present invention, a single time limiting circuit is employed for a plurality (N) of the drive circuits 10. Assuming that a time for damaging the solenoid as represented by $t_B$ when the current continues to flow therethrough, the number N of the drive circuits 10 must satisfy $N < (t_B/Kt_p)$.

That is, since, as shown in FIG. 1, the N set signals of the N drive circuits 10, i.e., printing command signals are logically summed by the OR gate 26 and the output of the OR gate 26 clears the counter 28, the output of the level detector 16 can be monitored once in the maximum time $Kt_pN$ shorter than $t_B$. Further when the printing command signal is not supplied in a time longer than $Kt_p$, it is possible to monitor the output of the level detector 16. Therefore, when there is any transistor 14 which continues to conduct over the predetermined time $t_{HD}$, the switch device 20 is actuated to isolate the solenoids 18 from the power source 22 to thereby prevent the damage of the solenoids 18.

As described hereinbefore, according to the present invention, any malfunction of the plurality of the hammer drive circuits can be monitored and the drive circuits can be automatically disconnected from the power source. Hence damage or destruction of the hammer driving solenoids can be prevented without fail. Further, large space is not required in the present invention for providing the time limiting circuit in the associated switch device in comparison with the conventional hammer drive safety device employing a fuse for each of the hammer drive circuits. It is, therefore, impossible to increase the number of hammer drive circuits maintaining the overall device as large as the conventional device. Furthermore, the manufacture of the overall device is facilitated and the manufacture thereof becomes inexpensive.

What is claimed is:

1. A hammer drive safety device for use in a printer which has a plurality of hammer drive circuits, each including a solenoid for driving its associated hammer provided along a character printing line and a switching element coupled to said solenoid, wherein said printer produces a character print command signal and said switching element is rendered conductive responsive to a character print command signal and driving power is supplied from a power source to said solenoid for driving its associated hammer when said switching element is rendered conductive, the improvement comprising: time limiting means adapted to produce an output when said character print command signal is not produced for more than a predetermined duration, detection means for detecting the conduction and nonconduction of said switching element and disconnection means interposed in a current path between said solenoid and said power source operable when said time limiting means produces its output and said detection means detects the conduction of said switching element.

2. A hammer drive safety device as defined in claim 1, wherein said time limiting means comprises a clock pulse oscillator for producing clock pulses with a predetermined time period; counter means coupled to said clock pulse oscillator for counting a predetermined number of the clock pulses responsive to the character print command signals; decoder means coupled to said counter means for delivering an output when said counter means counts the predetermined number of the clock pulses; and and bistable mean set by the output of said decoder means and reset by the character print command signals.

3. A hammer drive safety device as defined in claim 2, wherein the predetermined number of the clock pulse corresponding to an integer K satisfies the condition of $t_B/t_p > K > t_{HD}/t_p$ where: $t_B$ is a maximum time interval for which each of said solenoids is permitted to carry continuous current without damage; $t_p$ is a time period of the clock pulses; and $t_{HD}$ is a time period required to complete a printing of one character.

4. A hammer drive safety device as defined in claim 3, wherein said counter means is cleared by the character print command signals corresponding in number to N of said solenoids where N satisfies the condition $N > t_B/K.t_p$.

5. A hammer drive safety device as defined in claim 1, wherein said switch means comprises transistor means connected between said power source and said solenoid, said transistor means being triggered off when said time limiting means delivers its output and said detection means detects an actuation of the corresponding solenoid.

6. A hammer drive safety device as defined in claim 1, wherein said switch means comprises a transistor of common-emitter connection operative to be opened when said time limiting means delivers its output and when said detection means detects an actuation of the corresponding solenoid.

7. A hammer drive safety device as defined in claim 1, wherein said switch means comprises an electromagnetic relay means operative to be opened when said time limiting means delivers its output and when said detection means detects an actuation of the corresponding solenoid.

* * * * *